United States Patent
Bigo et al.

(10) Patent No.: US 7,319,823 B2
(45) Date of Patent: Jan. 15, 2008

(54) MODULATION SCHEME AND TRANSMISSION SYSTEM FOR NRZ SIGNALS WITH LEFT AND RIGHT SIDE FILTERING

(75) Inventors: Sébastien Bigo, Palaiseau (FR); Yann Frignac, Paris (FR); Wilfried Idler, Markgröningen (DE); Eugen Lach, Marbach (DE)

(73) Assignee: Alcatel, Paris (FR)

( * ) Notice: Subject to any disclaimer, the term of this patent is extended or adjusted under 35 U.S.C. 154(b) by 883 days.

(21) Appl. No.: 10/054,860

(22) Filed: Jan. 25, 2002

(65) Prior Publication Data
US 2002/0109888 A1 Aug. 15, 2002

(30) Foreign Application Priority Data
Feb. 14, 2001 (EP) .................. 01440028

(51) Int. Cl.
H04J 14/02 (2006.01)
H04B 10/12 (2006.01)
H04B 10/04 (2006.01)

(52) U.S. Cl. .................. 398/199; 398/183; 398/81; 398/149

(58) Field of Classification Search ............ 398/85, 398/149, 183–199, 79, 81, 82
See application file for complete search history.

(56) References Cited

U.S. PATENT DOCUMENTS 5,430,569 A * 7/1995 Blauvelt et al. ............ 398/199
5,608,561 A * 3/1997 Marcuse et al. ............ 398/192
5,778,113 A * 7/1998 Yu .............................. 385/3
6,122,414 A   9/2000 Shimizu
6,384,954 B1 * 5/2002 Webb ......................... 359/245
6,556,742 B2 * 4/2003 Shirasaki ..................... 385/24

FOREIGN PATENT DOCUMENTS

EP   0 901 244 A2   3/1999

OTHER PUBLICATIONS

Bigo et al, "Tbit/s (128×40 Gbit/s WDM) transmission over 3×100 km of TeraLight Fibre".*
Bigo S et al.: "Multi-Terabit/s Transmission over Alcatel Teralight Fiber" Alcatel Telecommunications Review, 4th Quarter 2000, pp. 288-296.
Gurib s et al.: "Experimental Evaluation of Teralight Resistance to Cross-Nonlinear Effects for Channel Spacing Down to 50 GHZ", Electronics Letters, May 25, 2000, pp. 959-961, vol. 36, No. 11.
Bigo S et al.: "Tbit/s (128×40 Gbit/s WDM) Transmission Over 3×100 km of Teralight FIBRE".

* cited by examiner

Primary Examiner—Dalzid Singh
(74) Attorney, Agent, or Firm—Sughrue Mion, PLLC

(57) ABSTRACT

The invention shows a transmission system with a transmitter function, a transmitting fiber and a receiver function where the transmitter function comprising lightsources (1), modulators (2) and a multiplexer (3), and the receiver comprising at least a demultiplexer (5), filters and electrical receivers where the channels for left side filtering are modulated with modulators with a negative chirp and for right side filtering with modulators with positive chirp.

5 Claims, 4 Drawing Sheets

Figure 1:
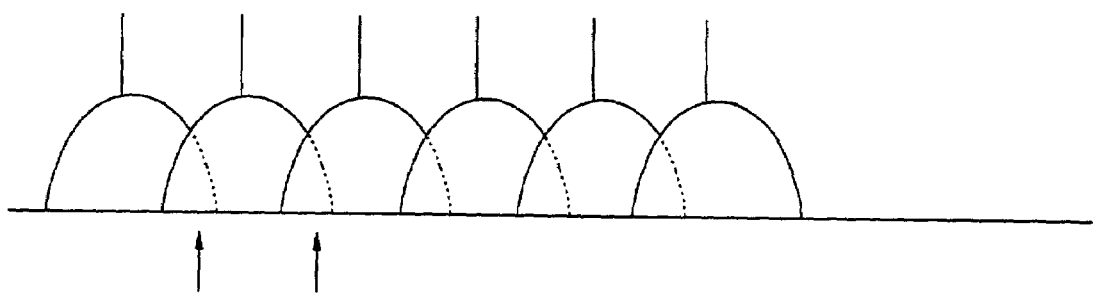

MODULATION SCHEME AND TRANSMISSION SYSTEM FOR NRZ SIGNALS WITH LEFT AND RIGHT SIDE FILTERING

BACKGROUND OF THE INVENTION

The invention relates to the field of transmitting digital data by optical means. It is more particularly concerned with transmission at high bit rates on long-haul fiber optic links, based on wavelength division multiplexing (WDM).

More specifically, the invention is related to a modulation scheme for a signal transmitted via a WDM transmission line with alternating left side and right-side filtering for adjacent channels at the receiver, with channels with alternating channel spacing of A and B, , channels for right side filtering being modulated by a modulator with positive chirp and channels for left side filtering being modulated by a modulator with a negative chirp.

The invention is also related to a transmission system with a transmitter function, a transmitting fiber and a receiver function: where the transmitter function comprising laser sources, external modulators and a multiplexer where the receiver comprising at least a demultiplexer, filters and receivers and the channels for left side filtering are modulated with modulators with a negative chirp and for right side filtering with modulator with positive chirp.

At the transmitter end, each channel is modulated by passing into a modulator of a given chirp. As compared to using a chirp-free (zero-chirp) device, using a negative-chirp modulator is similar to passing into a small section of fiber with negative dispersion (e.g. of DCF fiber). Conversely, using a positive-chirp modulator is similar to passing into a small section of fiber with positive dispersion (e.g. of Standard Single-Mode Fiber G652).

After modulation, the optical spectrum of a given channel consists of a carrier and two optical sidebands apart the carrier. The lower-wavelength sideband is referred to next as "left side" and the higher-wavelength sideband is referred to as "right-side".

Such transmission scheme uses an optical transmitter connected to an optical receiver by the fiber. The transmitter generally modulates the power of an optical carrier wave from a laser oscillator as a function of the information to be transmitted. NRZ or RZ modulation is very frequently used and entails varying the power of the carrier wave between two levels: a low level corresponding to extinction of the wave and a high level corresponding to a maximum optical power. The variations of levels are triggered at times imposed by a clock rate and this defines successive time cells allocated to the binary data to be transmitted. By convention, the low and high levels respectively represent the binary values "0" and "1". The maximum transmission distance is generally limited by the ability of receivers to detect without error these two power levels after the modulated wave has propagated in the optical link. The usual way to increase this distance is to increase the ratio between the average optical power of the high levels and that of the low levels, this ratio defining the "extinction ratio" which is one of the characteristics of the modulation.

For a given distance and a given extinction ratio, the information bit rate is limited by chromatic dispersion generated in the fibers. This dispersion results from the effective index of the fiber depending on the wavelength of the wave transported, and it has the consequence that the width of the transmitted pulses increases as they propagate along the fiber. This phenomenon is characterized by the dispersion coefficient D of the fiber, which is defined as a function of the propagation constant $\beta$ by the equation $D=-(2\pi c/\lambda^2)d^2\beta/d\omega^2$, where $\lambda$ and $\omega$ are respectively the wavelength and the angular frequency of the wave.

The value and sign of the dispersion coefficient D depend on the type of fiber and the transmission wavelength. For example, for the "standard" monomode fibers routinely used, and for $\lambda=1.55$ µm, the coefficient D is positive and has a value of 17 ps/(nm.km). In contrast, the coefficient D is zero for $\lambda=1.30$ µm. The coefficient D can generally be positive, zero or negative depending on the wavelength and the type of fiber used.

If the coefficient D has a non-zero value, to compensate the phenomenon of pulse widening in the case of NRZ or RZ modulation, it has already been proposed to modulate the phase $\phi$ (and therefore the frequency or the angular frequency) of the carrier wave in a manner that correlates to the modulation of the power. The phase $\phi$ (corresponds to the convention whereby the electric field of the carrier wave is represented as a function of time t by a complex expression of the type: Ap exp $(j\omega_o t)$ and the field of a transmitted wave S of amplitude A is represented by: $S=A \exp[j(\omega_o t+\phi)]$, where $\omega_o$ is the angular frequency of the carrier wave and $\phi$ is the phase of the transmitted wave.

To be more precise, to compensate chromatic dispersion, and if the coefficient D is positive, the phase must decrease on the rising edges of the pulses and increase on their falling edges. The modulated wave is then said to feature a transient negative "chirp". If, in contrast, the coefficient D is negative, the phase modulation must be reversed and the transient "chirp" is positive.

A transient "chirp" parameter $\alpha$ is introduced to characterize this modulation, and is defined by the equation $\alpha=2P(d\phi/dt)/(dP/dt)$, where P is the power of the modulated wave and $\phi$ is its phase in radians. For the previously mentioned standard fibers and for values of $\lambda$ close to 1.55 µm, for example, the value of the parameter $\alpha$ must be constant and substantially equal to $-1$ if by approximation a is regarded as constant. In an optimized system the chip of the modulator can compensate the chromatic dispersion of the fiber.

The problem chirping of a laser source can be solved to some extent by employing an external modulation technique. Among other external modulators, an absorption type modulator exhibits smaller chirping compared to semiconductor lasers; however, not zero. On the other hand, if a Mach-Zehnder modulator, which uses optical interference as its operational principle, is used as an external modulator operating in a push-pull modulation scheme, the wavelength chirping can be entirely removed theoretically. Accordingly, Mach-Zehnder modulators are expected to be key external modulators for use in ultra high-speed and long distance optical communication systems.

Some known Mach-Zehnder modulators have dielectric substances such as $LiNbO_3$. On the other hand, semiconductor Mach-Zehnder modulators are considered to be advantageous over the dielectric type Mach-Zehnder modulators, in view of the integration capability with optical elements such as semiconductor lasers or semiconductor optical amplifiers and electric elements such as FETs, as well as in view of their smaller dimensions and lower power consumption.

A Mach-Zehnder modulator of this kind comprises an interferometer structure with an input optical guide that splits into two branches that are combined to form an output guide. Electrodes apply respective electric fields to the two branches. The semiconductor Mach-Zehnder modulator generally uses changes in the refractive index generated upon a reverse-bias voltages applied to a p-n junction. When the input optical guide receives a carrier wave of constant power, two partial waves propagate in the two branches and then interfere at the output. The output guide then supplies a wave whose power and phase depend on the values of the electrical control voltages applied to the electrodes. Phase shifts of approximately 180° can be produced at the times when the instantaneous power of the transmitted wave is zero.

If the modulated control signal is applied to only one of the electrodes and the other electrode receives a fixed bias voltage, the optical signal output by the modulator features a non-zero transient "chirp" which can be positive or negative, depending on the sequence of binary data encountered and whether the edge is a rising or falling edge.

In the U.S. Pat. No. 6,122,414 experiments show that push-pull modulation achieves a small waveform distortion due to pulse compression and thus maintains a half-value width better than a single arm modulation. From the results, it is considered that the push-pull modulation can provide a double or triple transmission distance compared to the single arm modulation.

A push-pull driven semiconductor Mach-Zehnder modulator generally requires a pair of drivers for applying drive voltages to electrodes of the respective phase modulators and a timing generator for driving the phase modulators exactly in opposite phases. It is difficult to accurately adjust the timing by the timing generator, especially at higher frequencies, for example, over 2.5 Gb/s, which fact renders the operation of the phase modulator arms to be difficult at such high frequencies.

The invention solves the problems of high bit rate transmission at least higher than 10 Gbit/s—using a single arm modulator for modulation and simultaneously an optimize modulation scheme for reducing bandwidth.

A modulation scheme know as VSB (vestigial side band modulation) is explained in "5.12 Tbit/s Transmission over 3×100 km of Teraliight fiber" Bigo, S. et al., paperPD2, PP40-41,ECOC 2000.

The two side bands of a NRZ spectrum generally contain redundant information. It is therefore tempting to filter out one of them in order to increase spectral efficiency, a technique known as VSB. However VSB is difficult to implement at the transmitter because the suppressed side bands rapidly reconstruct through fiber non linearities.

So a VSB filtering at the receiver side is proposed.

SUMMARY OF THE INVENTION

The inventional solution comprises a VSB filtering scheme with alternating side band filtering for a best management of bandwidth. The decrease of used bandwidth for a transmission system with a VSB filtering scheme is dramatically. The solution—using the chirp behavior of the high speed modulators—increases the performance of the transmission system.

The inventional solution for the transmission system shows the advantage that the combination of right side filtered channels with modulators with positive chirp and left-side filtered channels with modulators with negative chirp exhibits best performance.

SHORT DESCRIPTION OF THE DRAWINGS

Figure 2:
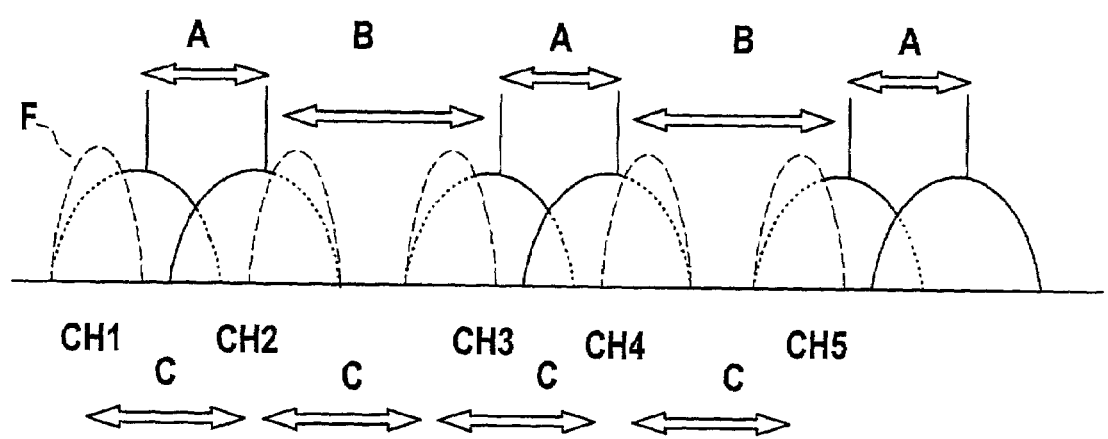
Figure 3:
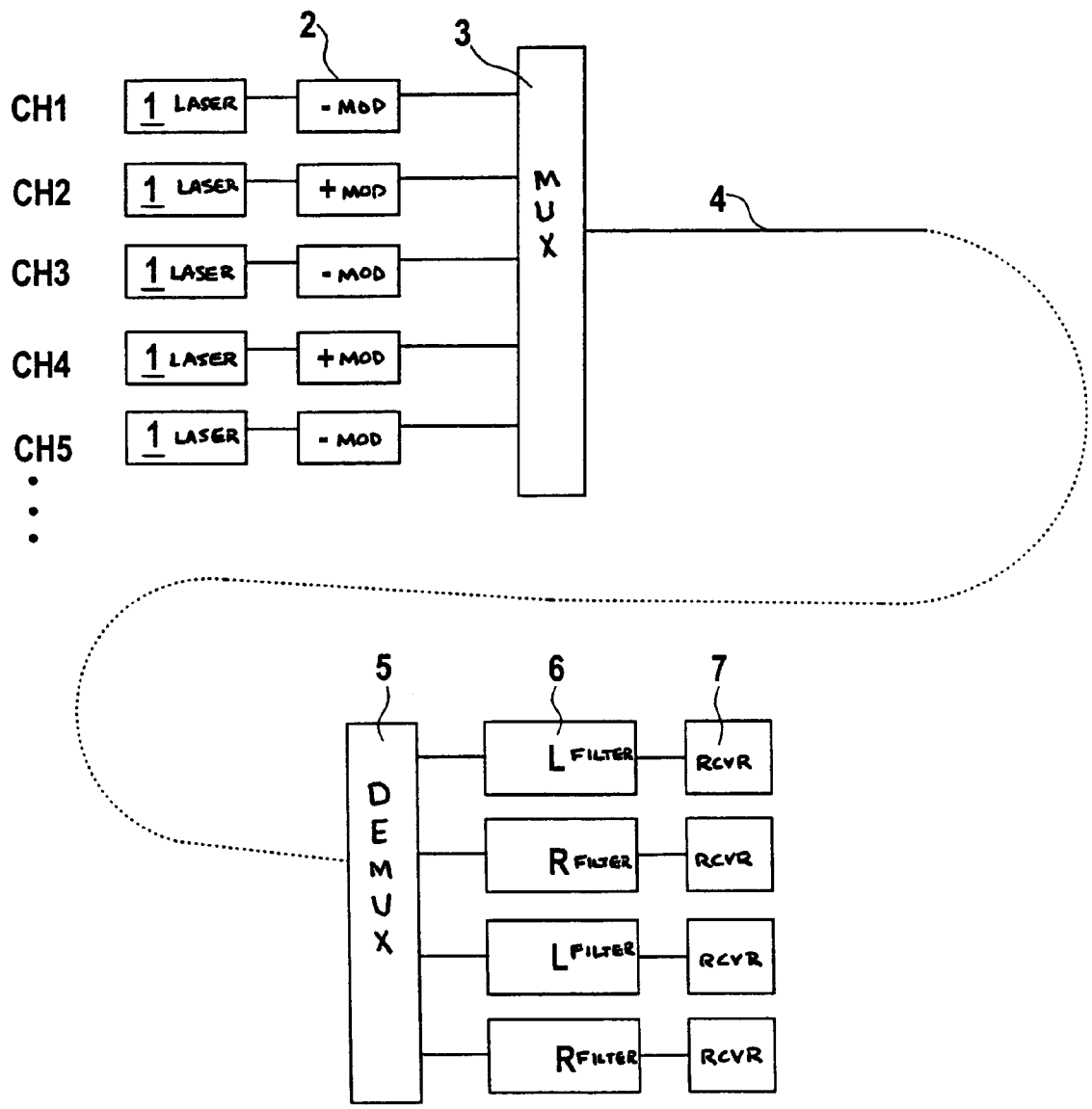
Figure 4:
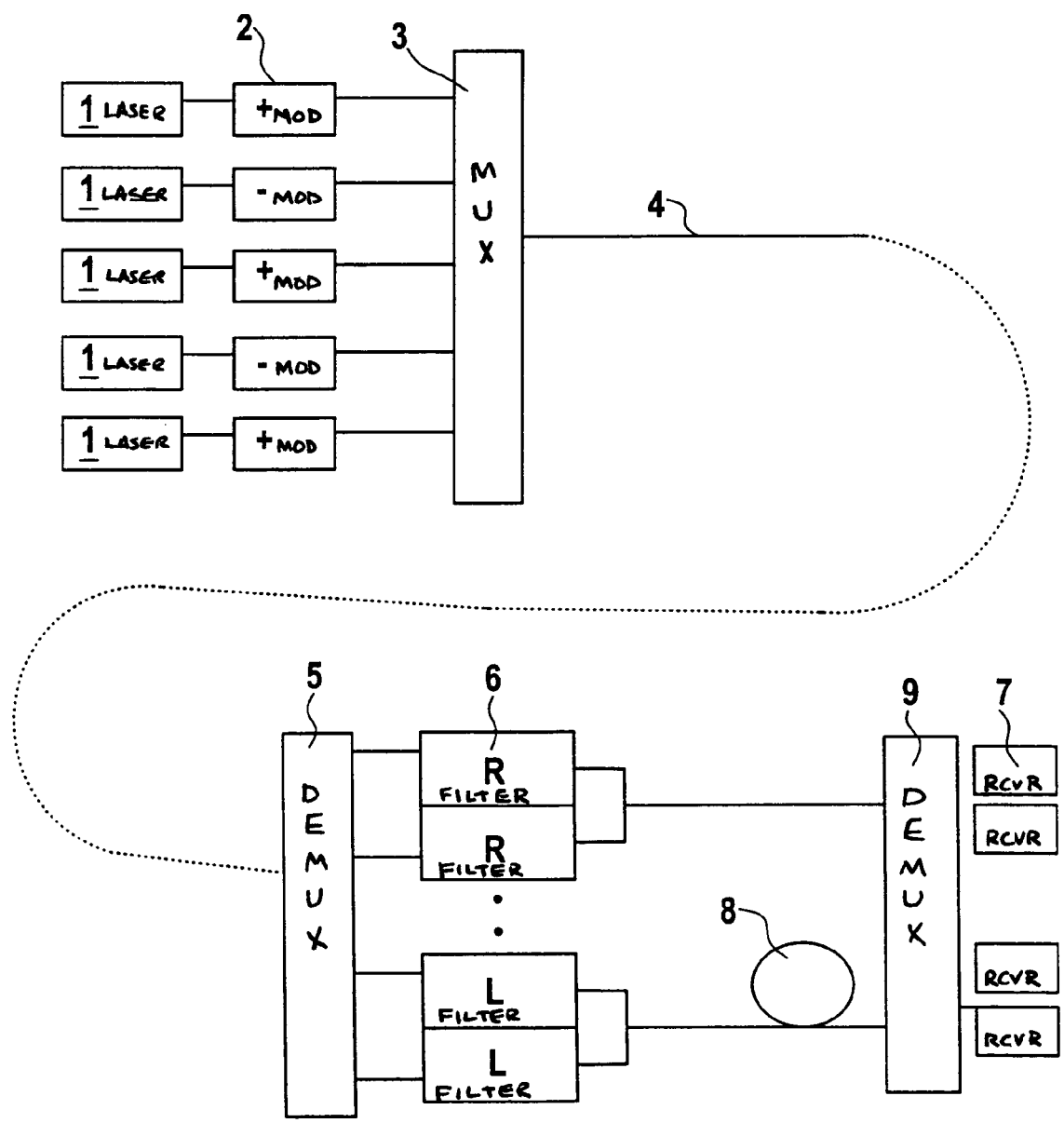
Figure 5:
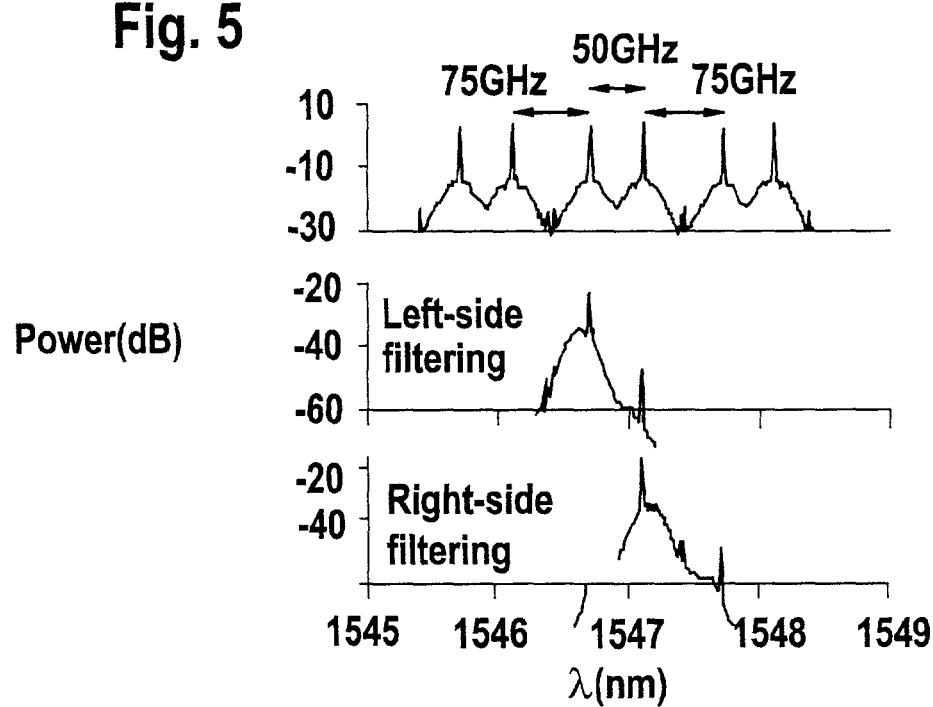
Figure 6:
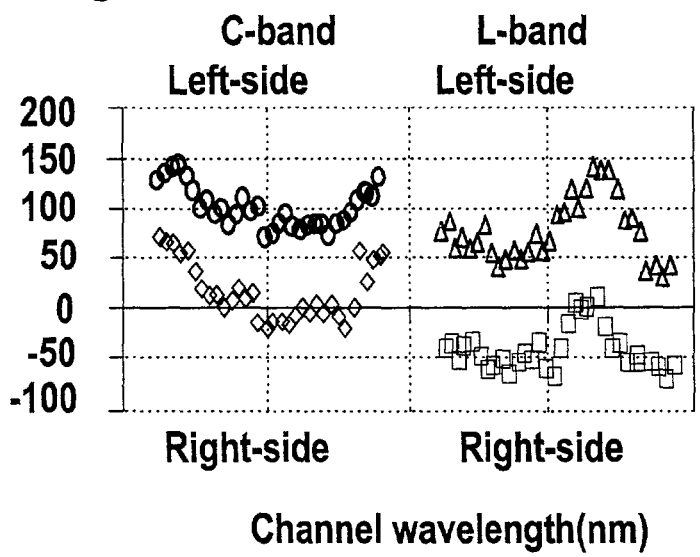

FIG. 1 Spectrum of adjacent channels in DWDM
FIG. 2 Vestigial Side band filtering for non-equidistant channels
FIG. 3 Transmission system with chirping modulators
FIG. 4 Transmission system with two stage channel demultiplexing
FIG. 5 Spectrum of VSB channels
FIG. 6 Experimental results for VSB transmission and filtering optimal residual chromatic dispersion as a function of channel number.

DETAILED DESCRIPTION OF THE INVENTION

The spectrum of an intensity-modulated signal is symmetric to the carrier frequency of the wavelength channels. In FIG. 1 the carrier is marked by a line. The left and the right side of the signal generally contain the same information. In the overlapping areas marked by an arrow the information of one channels can no longer be clearly distinguished from the adjacent channels information. In a case the channel spacing decreases–, the overlapping areas increase.

FIG. 2 shows a channel distribution which not equidistant. The first two channels CH 1 and CH 2 are divided by a spectral space A. The space between the next channel CH3 is then B. Then pairs of channels are transmitted separated by a larger space than that in between. Now the filtering functions F filters the left side for channel CH1 and the right side of Channel CH2. Again CH3 is left side filtered and CH4 on the right side. In a preferred solution, the values of A and B may be chosen such that the filter functions have their maxima at a space C, which is constant from one channel to another. The bandwidth can be used in a optimal way.

One first embodiment of the invention is shown in FIG. 3. The transmitter function is realized with lasers 1 connected to modulators 2. The modulators have alternating positive or negative chirp and are connected to a multiplexer 3. The multiplexer is tapped to the transmission line 4. The receiver function is realized with a demultiplexer 5 connected to the transmission line 4 and filters 6 . The filters are attached to receivers 7.

A first wavelength channel is sent by the laser 1. This channel is modulated by an external modulator 2. For high bitrates a single arm modulator is the preferred modulator. Single-arm Mach-Zehnder modulators (the only type of modulators available today at 40 Gbit/s), exhibit a positive or negative chirp, depending on the bias conditions. The first channel CH1 uses a modulator which exhibits a negative chirp. The signal is multiplexed together with the other channels in the multiplexer 3. The second channel uses a modulator with a positive chirp function and so on.

The multiplexed signals are transmitted over the transmission line 4 to the demultiplexer 5. Here the DWDM signal is demultiplexed in the different wavelength channels. The first wavelength channel is than filtered by a left side filtering the second by a right side filtering and so on.

With the parameters of the experiment desribed in Bigo, S. et al., paperPD2, PP40-41,ECOC 2000, FIG. 5 shows the optimal residual dispersion as obtained after 300 km distance for the whole multiplex after optimization by 10 ps/nm steps. This residual dispersion was derived from the full characterization of the fibres used in the experiment. For a given channel (i.e. a given side lobe direction), positive and negative chirps were both tested at the transmitter side, with a dispersion at the end of the link varied accordingly to reach optimal performance. The transmission is made with channels spaced 50 GHz and 75 GHz from another. The spectrum shows the received structure without filtering as well as a left-side filtered single channel and a right-side filtered single channel.

In the optimal conditions, it can be seen in FIG. 6 that left-filtered channels always exhibit a higher residual optimal dispersion (by approximately 100 ps/nm with respect to right-side filtering) as a result of an initial bias point set to negative chirp. On the other hand, right-side filtered channels exhibit a lower residual dispersion, to compensate for an initial positive modulator chirp.

This results shows that the second embodiment of the invention as shown in FIG. 4 is advantageous.

The transmitter function works as described for FIG. 3. The receiver side uses a first demultiplexer 5 for demultiplexing channels for left side filtering and for right side filtering. The channels for the left side filtering are fed to a dispersion compensating fiber 8. Than the channels are demultiplexed in a second demultiplexer 9 and analyzed in the receivers 7.

The invention claimed is:

1. A method for modulating a non-return to zero (NRZ) signal transmitted to a receiver utilizing alternating left side and right side filtering for adjacent channels having alternating channel spacing, the method comprising:
    modulating channels, which are to be subjected to the right side filtering at the receiver, with a positive chirp; and
    modulating channels, which are to be subjected to the left side filtering at the receiver, with a negative chirp.

2. The method according to claim 1, wherein at the receiver, central frequencies of two consecutive filters, whether left-side or right-side, are equidistant in the frequency domain.

3. A transmission system comprising a transmitter, a transmitting fiber and a receiver,
    the transmitter comprising a plurality of light sources for generating a plurality of channels, a plurality of modulators for modulating the channels, and a multiplexer for multiplexing the channels which have been modulated,
    the receiver comprising a first demultiplexer for demultiplexing the channels which have been multiplexed, a plurality of filters for left-side and right side filtering the channels which have been demultiplexed, and a plurality of receivers for receiving the channels which have been filtered,
    wherein the modulators of the transmitter modulate channels which are to be subjected to the left side filtering with a negative chirp and modulate channels which are to be subjected to the right side filtering with a positive chirp.

4. A transmission system according to claim 3, wherein the first demultiplexer demultiplexes the channels to be to be subjected to the left side filtering from the channels to be subjected to the right side filtering,
    wherein the receiver further comprises:
    a compensating fiber of positive chromatic dispersion which receives the channels subjected to the left side filtering; and
    a second demultiplexer for demultiplexing the channels subjected to the left side filtering which are transmitted through the compensating filter and the channels subjected to the right side filtering.

5. A transmission system according to claim 3, wherein the first demultiplexer demultiplexes the channels to be subjected to the left side filtering from the channels to be subjected to the right side filtering, wherein the receiver further comprises:
    a compensating fiber of negative chromatic dispersion which receives the channels subjected to the right side filtering; and
    a second demultiplexer for demultiplexing the channels subjected to the right side filtering which are transmitted through the compensating filter and the channels subjected to the right side filtering.

* * * * *